United States Patent [19]
Takano et al.

[11] Patent Number: 5,289,524
[45] Date of Patent: Feb. 22, 1994

[54] DATA TRANSMISSION METHOD AND UNIT

[75] Inventors: Masanori Takano; Toshihiro Yabe, both of Kawasaki, Japan

[73] Assignee: Fujitsu Limited, Kawasaki, Japan

[21] Appl. No.: 800,150

[22] Filed: Nov. 27, 1991

[30] Foreign Application Priority Data

Nov. 27, 1990 [JP] Japan .................................. 2-327312

[51] Int. Cl.[5] .................... H04M 11/04; H04M 11/00; H04Q 7/00; H04B 1/04
[52] U.S. Cl. ........................................ 379/57; 379/39; 379/58; 455/383; 455/541; 455/127
[58] Field of Search ............................. 379/39, 57, 58; 455/38.3, 54.1, 127

[56] References Cited

U.S. PATENT DOCUMENTS

| | | | |
|---|---|---|---|
| 4,023,139 | 5/1977 | Samburg | 379/39 |
| 4,887,291 | 12/1989 | Stillwell | 379/57 |
| 5,109,220 | 4/1992 | Breeden et al. | 379/57 |
| 5,125,021 | 6/1992 | Lebowitz | 379/39 |
| 5,140,626 | 8/1992 | Ory et al. | 379/67 |
| 5,151,930 | 9/1992 | Hagl | 379/57 |

FOREIGN PATENT DOCUMENTS 61-206353 9/1986 Japan .
61-228760 10/1986 Japan .

Primary Examiner—James L. Dwyer
Assistant Examiner—Vijay Shankar

[57] ABSTRACT

An in-house paging system includes a call controller connected to an in-house switching unit for providing an interfacing process in response to a call request from an extension terminal. A plurality of transmitting units are connected to the call controller through a signal line and a power source line. A pager terminal is provided for notifying a maintenance staff of a call signal from a transmitting unit on receipt of the signal. The transmitting unit comprises a detecting unit for detecting whether or not an abnormal condition arises in a signal line or a power source line to a call controller and a signal/power-source line abnormal signal transmitting unit for transmitting abnormal condition information to the pager terminal when the detecting unit detects an abnormal condition in the signal line or the power source line. A battery as a backup power supply unit is used in case of power disconnection.

12 Claims, 7 Drawing Sheets

DATA TRANSMISSION METHOD AND UNIT

BACKGROUND OF THE INVENTION

The present invention relates to an in-house paging system capable of issuing a call request to a pager terminal through an in-house switching unit.

Recently, the in-house paging system has been widely used in hotels, office buildings, etc. With this in-house paging system, units and devices are connected through signal lines and power source lines. When an abnormal condition such as defective disconnection arises in these signal lines or power source lines, it must be notified immediately to a maintenance staff, etc. and monitored by a reasonably priced abnormal condition monitor.

FIG. 1 is a block diagram for indicating an in-house paging system of the prior art technology. In FIG. 1, 1 is an in-house switching unit (PBX) for accommodating a plurality of extension terminals 2-1 and 2-2.

4 is a call controller connected to the in-house switching unit 1 for interfacing in response to a call request from the extension terminals 2. It comprises a plurality of a call control interface units 401, a controller 402 having its own memory 403, and a modem 404.

The call control interface units 401 are provided between the in-house switching unit 1 and the controller 402 and control the transmission of data, etc. between them. Each call control interface unit 401 comprises a PBX interface unit 4011, a voice generator 4012 for generating a voice message to the extension terminals 2, and a DTMF detector 4013 for detecting a DTMF signal issued by the extension terminals 2 from a dial or pushbutton phone unit.

The controller 402 comprises a microprocessor unit (MPU) for sending a necessary control signal to each of the call control interface unit 401 and the modem 404.

The modem 404 modulates/demodulates a signal to and from a transmitting unit 5 if necessary.

5 indicates a plurality of transmitting units connected to the call controller 4 and distributed to a number of points. One transmitting unit 5 comprises a modem 501, an encoder 502, a decoder 503, a sending or transmitting unit 504, a receiving unit 505, a controller 506, a switch 507, and an antenna 508.

The modem 501 modulates/demodulates a signal to and from the call controller 4, if necessary. The encoder 502 encodes a signal from the modem 501. The decoder 503 decodes a signal and then sends it to the modem 501. The sending unit 504 pre-processes for transmission a signal from the encoder 502 then transmits it through the switch 507 and the antenna 508. The receiver 505 pre-processes for transmission a signal received through the antenna 508. The controller 506 controls the switching operation of switches, etc. The switch 507 receives a signal from the controller 506 and switches it to the sending or the receiving units.

A pager terminal 6 receives a call signal from the transmitting unit 5 through a wireless transmission line and notifies the maintenance staff of it. A plurality of pager terminals 6 can be provided within the area of one transmitting unit 5.

In the above described configuration, a call request from an extension terminal (phone unit) 2 to the pager terminal 6 is transmitted by the in-house switching unit 1 to the controller 402 after the requesting terminal is identified through the PBX interface 4011.

The controller 402 compares the transmitted number with the contents of the memory 403 to determine whether or not the number is in active service. If yes, it controls the voice generator 4012 to make an announcement such as "Enter a message," then enters the wait state for the input of DTMF.

If not in active service, the controller 402 controls the voice generator 4012 to make an announcement such as "Not in active service", and controls the PBX interface 4011 to disconnect the line to the in-house switching unit 1 after the announcement.

On receiving a DTMF signal, the DTMF detector 4013 detects the number of the depressed button, and outputs the result to the controller 402. If the transmitted signal indicates "a standard statement code 11", for example, the controller 402 controls the voice generator 4012 to issue an announcement such as "A standard statement code 11 will be sent, please hang up and wait." The PBX interface 4011 is then instructed to disconnect the line after the announcement.

On receiving a call number and call data, the controller 402 sends the data to each of transmitting units 5 through the modem 404.

The transmitting unit 5 comprises modem 501, encoder 502, decoder 503, sending unit 504, receiving unit 505, controller 506, switch 507, and antenna 508 as described above.

A signal applied to the transmitting unit 5 through the modem 404 is demodulated by the modem 501 to call data including a call number, etc. Then, it is coded by the encoder 502 into the format of a POCSAG (British Post Office Code Standardization Advisory Group) signal, and transmitted from an antenna through the sending unit 504 and the switch 507.

In this process, the controller 506 of the transmitting unit 5 controls the switch 507 to connect the receiving unit 505 and the antenna 508, then determines whether or not other transmitting units 5 are transmitting data while turning them temporarily in the receiving state. If not, the controller 506 controls the switch 507 to connect the sending unit 504 and the antenna 508.

Next, a monitoring function for monitoring whether or not an abnormal condition such as a defective disconnection arises in signal lines and power source lines is described.

FIG. 1 shows a basic configuration for transmitting data by the in-house paging system. However, a power source and various detecting circuits are provided to operate a transmitting unit other than to transmit data. FIG. 2 shows a detailed configuration of an in-house paging system of the prior art technology.

As shown in FIG. 2, the call controller 4 and the transmitting unit 5 are connected through a signal line 7 and a power source line 8. The signal line 7 transmits a signal between the modem 404 of the call controller 4 and the modem 501 of the transmitting unit 5. An abnormal condition can be detected by the carrier detector 407 and the synchronous detector 408 of the call controller 4, and a carrier detector 512 and a synchronous detector 513 of the transmitting unit 5.

The power source 8 sends electric power from the power source 405 of the call controller 4 to the receiving unit 509 of the transmitting unit 5. The electric power is received by an electric power receiver 509, monitored for voltage by a voltage monitor 510, and applied to various parts of the transmitting unit through a DC/DC converter 511. The call controller 4 is also provided with a voltage monitor 406.

In the above described configuration, the in-house paging system of the prior art technology shown in FIG. 2 monitors for abnormal conditions of the the signal line 7 and the power source line 8 between the call controller 4 and the transmitting unit 5 as follows:

The transmission of a signal between the call controller 4 and the transmitting unit 5 is performed by the modems 404 and 501; the call controller 4 and transmitting unit 5 both perform carrier and synchronous detection; and the call controller 4 manages the monitor information collectively. The voltage of the power source is also monitored by the call controller 4 and the transmitting unit 5, and a monitoring staff monitors an abnormal condition only through the call controller 4.

In the in-house paging system of the prior art technology shown in FIGS. 1 and 2, when a signal line or a power source line enters the disconnection state between a call controller and a transmitting unit, the disconnection state cannot be notified to a maintenance staff because he or she is not supposed to stay at the fixed position and are often away from the call controller. That is, in the prior art technology, a maintenance staff must stand by the call controller to monitor an alarm lamp without staying away from his or her position. Therefore, such a monitoring sytem is inefficient and costly.

SUMMARY OF THE INVENTION

The present invention relates to an in-house paging system capable of issuing a call request from an extension terminal to a pager terminal through an in-house switching unit.

An object of the present invention is to immediately notify a maintenance staff of an abnormal condition in a signal line and a power source line and to easily monitor, at a low price.

A paging system comprising a pager terminal for notifying of a call signal from a transmitting unit on receipt of it is provided with a detecting part for detecting whether or not an abnormal condition has arisen in a signal line or a power source line to a call controller. A signal/power-source line abnormal signal transmitting unit is included for transmitting the abnormal condition information to a pager terminal when the detecting part detects an abnormal condition in a signal line or a power source line. The system is provided with a battery as a backup unit in case of power disconnection.

DESCRIPTION OF THE PREFERRED EMBODIMENT

Figure 1:
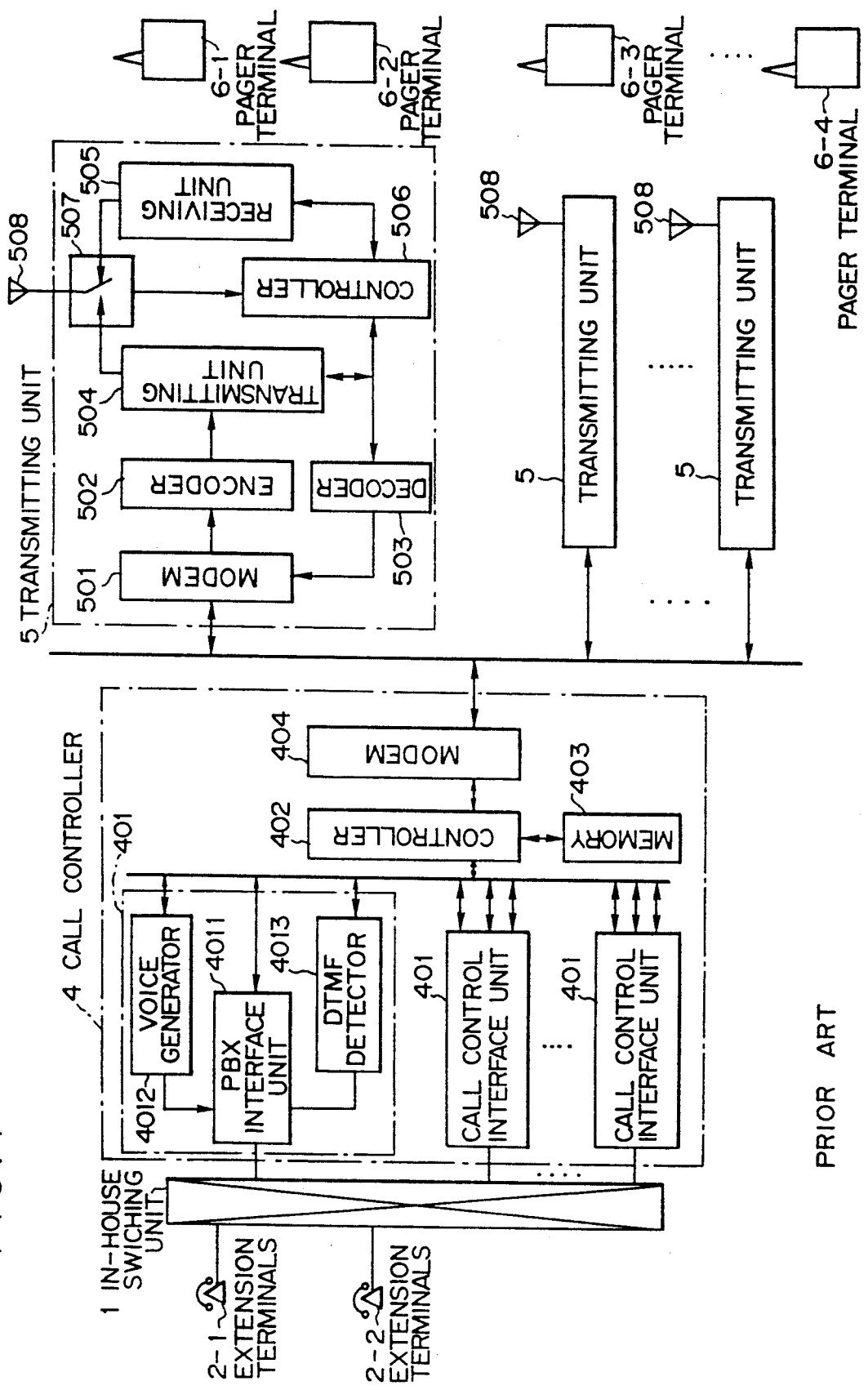
FIG. 1 is a block diagram for indicating an in-house paging system of the prior art technology.
Figure 2:
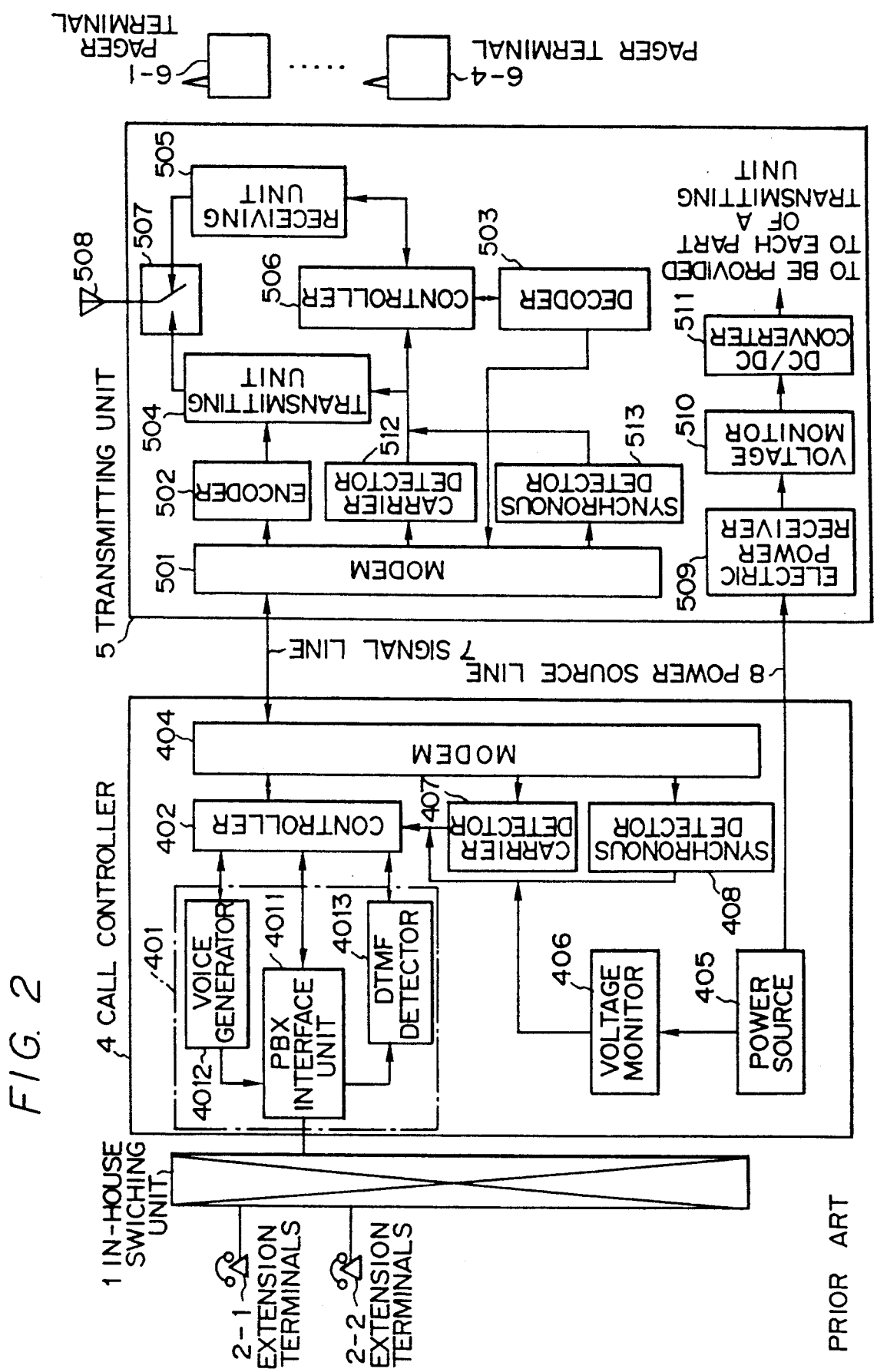
FIG. 2 shows a detailed configuration of an in-house paging system of the prior art technology.
Figure 3:
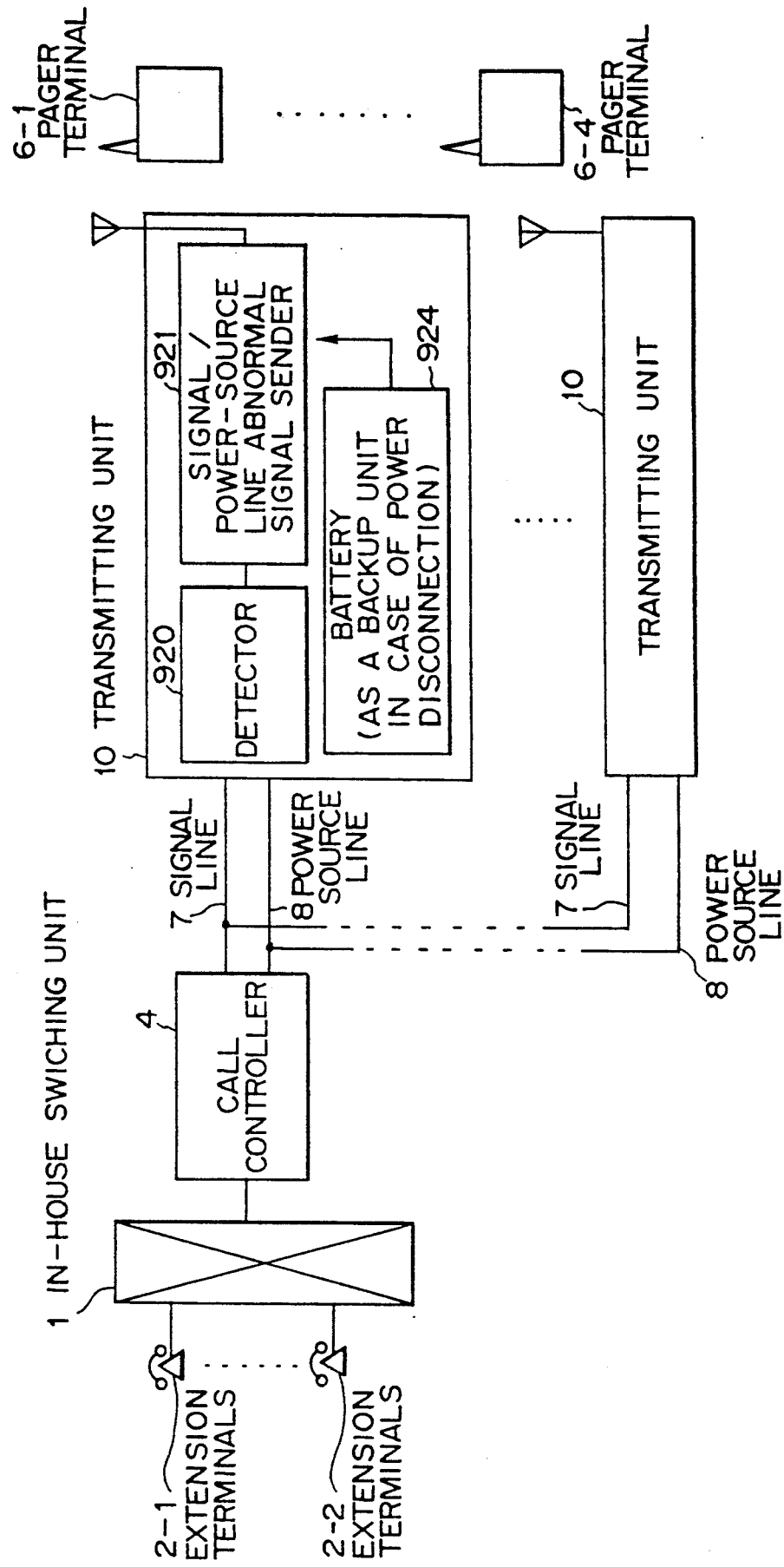
FIG. 3 is a block diagram for explaining the principle of the present invention.

FIG. 3 is a block diagram for explaining the principle of the present invention.

In FIG. 3, 1 is an in-house switching unit; and 2 is an extension terminal connected to the in-house switching unit 1.

4 is a call controller connected to the in-house switching unit 1, and interfaces in response to a call request from the extension terminal 2.

10 indicates a plurality of transmitting units connected to the call controller and distributed to a number of parts; and 6 is a pager terminal for receiving a call signal from the transmitting unit 10 and notifying of it.

When parts are the same as those in the prior art technology, they are assigned the same symbols.

The transmitting unit 10 comprises a detector 920 for detecting whether or not an abnormal condition has arisen in the signal line 7 or the power source line 8 to the call controller 4; a signal/power-source line abnormal signal sender 921 for notifying the pager terminal 6 of an abnormal condition of the signal line 7 or the power source line 8 when it is detected by the detector 920; and a battery 924 as a backup unit in case of power disconnection.

In the in-house paging system of the present invention shown in FIG. 3, when a call request is issued from the extension terminal 2, the call request is sent to the desired pager terminal 6 through the in-house switching unit 1, the call controller 4, and the transmitting unit 10, thus operating the pager terminal 6. When an abnormal condition is detected in the signal line 7 or the power source line 8 by the detector 920 of the transmitting unit 10, the signal/power-source line abnormal signal sender 921 notifies the pager terminal 6. Then, even though the power source line 8 is disconnected and the electric power is stopped, the operation of the battery 924 enables continued operation of the transmitting unit 10.

The embodiment of the present invention is described further in detail.

Figure 4:
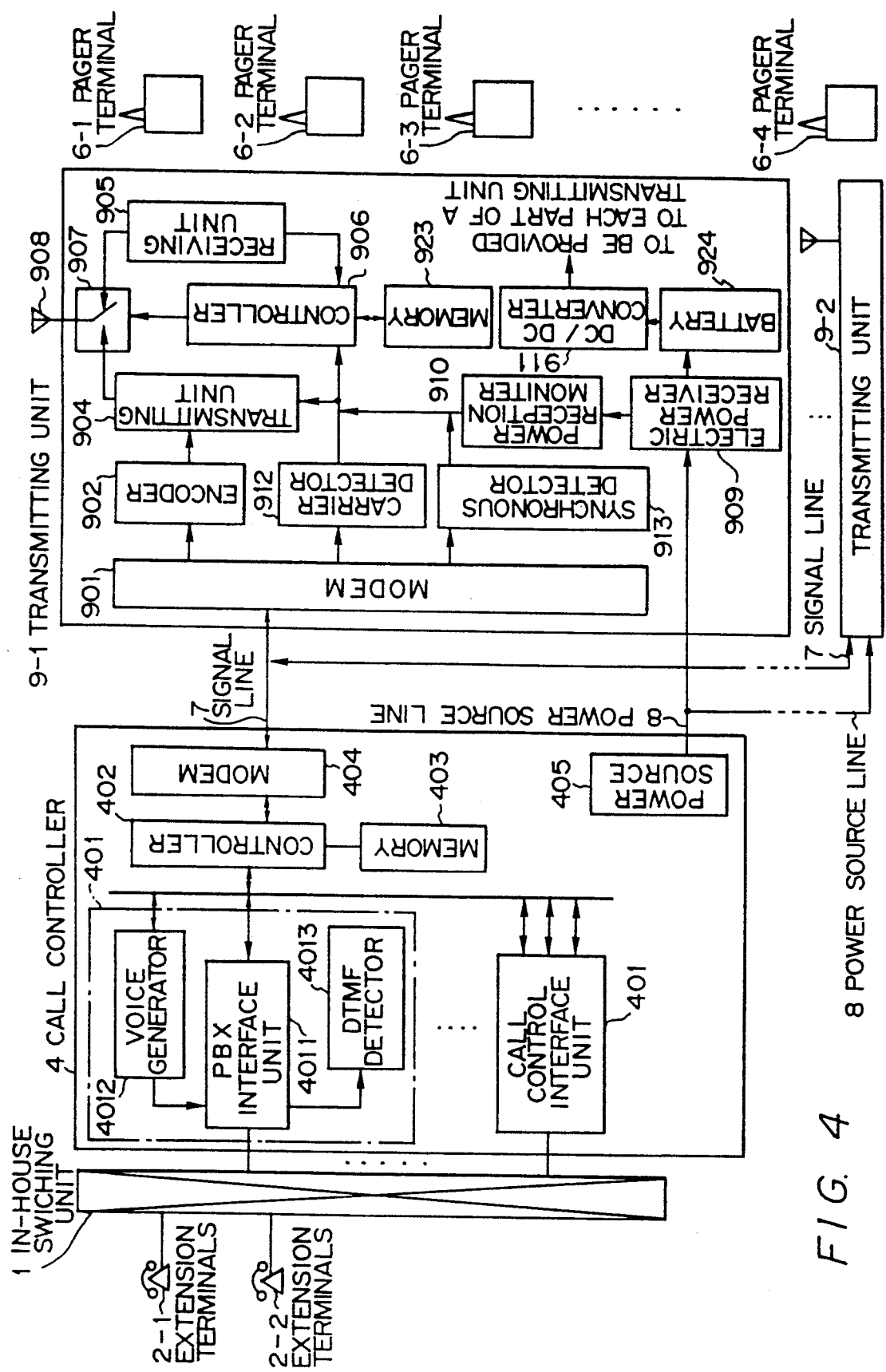
FIG. 4 is a block diagram for showing an embodiment of the present invention.

FIG. 4 is a block diagram for showing an embodiment of the present invention.

In FIG. 4, an in-house switching unit 1 (PBX) accommodates a plurality of extension terminals 2.

4 is a call controller connected to the in-house switching unit 1 for interfaces in response to the extension terminal 2. It comprises a plurality of call control interfaces 401, a controller 402 having its own memory 403, and a modem 404.

In this embodiment, the in-house switching unit 1, extension terminals 2-1 and 2-2, call control interface 401, controller 402, modem 404, and call controller 4 are the same parts as those in the prior art technology, so the explanation is skipped for them.

9 indicates a plurality of transmitting units connected to the call controller 4 through the signal line 7 and the power source line 8 and distributed to a number of positions (for example, hallways in a hotel, each floor and passage in an office building, etc.). Each of the transmitting units 9 is supplied with a modem 901, an encoder 902, a sending unit 904, a receiving unit 905, a controller 906, a switch 907, an antenna 908, and furthermore provided with a detector 920 for detecting whether or not an abnormal condition such as disconnection exists in the signal line 7 or the power source line 8 to the call controller 4, a signal/power-source line abnormal signal sender 921 for sending the notification to the pager terminal 6 when an abnormal condition such as disconnection is detected in the signal line 7 or the power source line 8 by the detector 920, and a battery (rechargeable) 924 as a backup unit in case of power disconnection.

That is, each of the transmitting units 9 comprises a modem 901, an encoder 902, a sending unit 904, a receiving unit 905, a controller 906 having its own memory 921, a switch 907, an antenna 908, and also a carrier detector 912, a synchronous detector 913, an electric power receiver 909, a power reception monitor 910, a battery 924, and a DC/DC converter 911.

The signal line 7 transmits a signal between the modem 404 of the call controller 4 and the modem 901 of the transmitting unit 5, and an abnormal condition of the signal line 7 can be detected by the carrier detector 912 and the synchronous detector 913 of the transmitting unit 9.

A power source line 8 sends electric power provided by the power source 405 of the call controller 4 to the electric power receiver 909 of the transmitting unit 9. The electric voltage of the power applied to the electric power receiver 909 is monitored by the power reception monitor 910, and the monitor result is sent to the controller 906.

The electric power applied to the electric power receiver 909 is provided to each part of a transmitting unit through the battery 924 and the DC/DC converter 911. Therefore, if the power source line 8 is disconnected and the electric power receiver 909 does not receive electric power, it can be provided to each part of a transmitting unit through the DC/DC converter 911.

The modem 901 demodulates a modulation signal sent from the modem 404. The demodulated signal indicates call data including a call number, etc. The demodulated signal is coded in the format of a POCSAG signal by an encoder, and transmitted to a pager terminal through the sending unit 904, the switch 907, and the antenna 908.

The switch 907 switches to the receiving or the sending operation. The antenna 908 sends/receives electric waves to/from pagers 6-1-6-4.

The pager terminal 6 receives a call signal through a wireless transmission line and notifies the maintenance staff, and a plurality of pager terminals 6 can exist in the area of one transmitting unit 5.

In the above described configuration, when an extension terminal (telephone unit) 2-1 or 2-2 issues a call request to a pager terminal, the in-house switching unit 1 transmits the request data including the number of the destination terminal through the PBX interface 4011 to the pager terminal.

The controller 402 compares the transmitted number with the contents of the memory 403 to determine whether or not the number is in active service. If yes, it controls the voice generator 4012 to make an announcement such as "Enter a message," then enters the wait state for the input of DTMF.

If not in active service, the controller 402 controls the voice generator 4012 to make an announcement such as "not in-active service, and controls the PBX interface 4011 to disconnect the line to the in-house switching unit 1 after the announcement.

On receiving a DTMF signal, the DTMF detector 4013 detects the number of the depressed button, and outputs the result to the controller 402. If the transmitted signal indicates "a standard statement code 11," for example, the controller 402 controls the voice generator 4012 to issue an announcement such as "A standard statement code 11 will be sent, over. Please hang up and wait." The PBX interface 4011 is then instructed to disconnect the line after the announcement.

On receiving a call number and call data, the controller 402 sends call data including a call number, etc. to each of transmitting units 9-1 and 9-2 through the modem 404.

The modem 901 in the transmitting unit 9 demodulates the data, and applies the demodulated call number and call data to the encoder 902. The encoder 902 converts the data to the format of a POCSAG signal, and applies them to the sending unit 904. The sending unit 904 performs required modulation and transmits the resultant signal from the antenna 908. At this time, the controller 906 of the transmitting unit 9 controls the switch 907 to connect the receiving unit 905 and the antenna 908, and checks whether or not other transmitting units are transmitting data. If not, the controller 906 controls the switch 9 to connect the sending unit 904 and the antenna 908, and then transmits data.

When an abnormal condition (such as disconnection) arises in the signal line 7 between the call controller 4 and the transmitting unit 9, the abnormal condition is detected by the carrier detector 912 and the synchronous detector 913 of this transmitting unit 9-1 (hereinafter referred to as a defective transmitting unit 9-1), and the result is outputted to the controller 906. The controller 906 comprises a processor, etc. and retrieves from the memory 923 a code corresponding to the abnormal condition of the signal line 7 (for example, a code indicating that "an abnormal condition has arisen in the signal line between a transmitting unit and a call controller") and the identification information ID for identifying a maintenance staff's pager terminal 6 being called, and then transmits them to the sending unit 904. The sending unit 904 converts the data to a POCSAG signal, and transmits it after confirming that no other transmitting unit 9 is transmitting data.

As an abnormal condition can be detected on the side of a call controller, a notification is sent to the other transmitting unit 9-2 that an abnormal condition has arisen in the defective transmitting unit 9-1. Thus, the abnormal condition detected in the signal line 7 between the defective transmitting unit 5 and the call controller 4 can be notified by other transmitting units 9 to the pager terminal 6.

Figure 5:
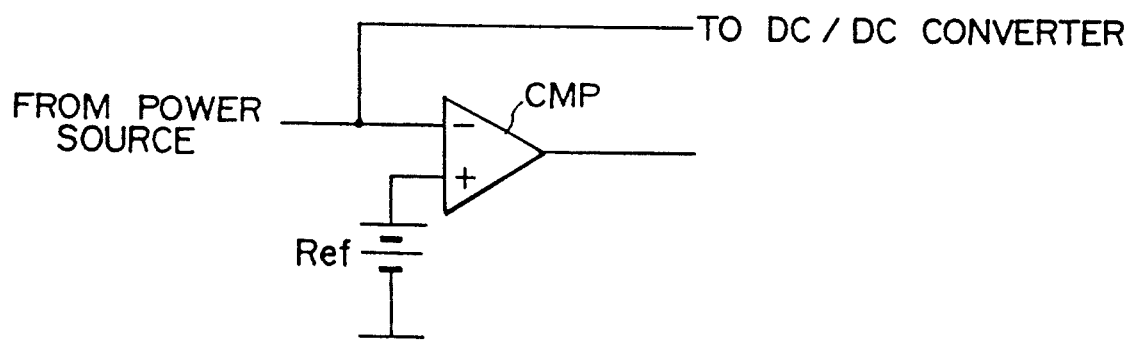
FIG. 5 shows a detailed circuit of a voltage monitor.

On the other hand, when an abnormal condition arises in the power source line 8, the power reception monitor 910 of the transmitting unit 9 detects an abnormal and outputs the detection result to the controller 906. The power reception monitor 910 comprises a comparator CMP as shown in FIG. 5. The voltage value of the power source is applied to the inverted input of the comparator CMP, and the reference voltage value Ref is applied to the non-inverted input. When the electric power is provided, the power source voltage value is larger than the reference voltage value. Therefore, the output of the comparator CMP shows the L level. However, when the power source is stopped, the voltage applied to the inverted input decreases to zero, thus changing the CMP output to the H level. On receiving the detection result from the power reception monitor 910, the controller 906 retrieves from the memory 923 a code corresponding to the abnormal condition of the power source line 8 (for example, a code indicating that "an abnormal condition arises in the power source line between a transmitting unit and a call controller") and the identification information ID for identifying a maintenance staff's pager terminal 6 being called, and then transmits them to the sending unit 904. The sending unit 904 converts the data to a POC- SAG signal, and transmits it after confirming that no other transmitting unit 9-2 is transmitting data. In this case, the power source line 8 is disconnected and the power supply is stopped, but the backup battery 524 supplies and operates the transmitting unit 9-1 with electric power. An abnormal condition in the power source line can be detected in the current check by the call controller. Therefore, an abnormal condition in the defective transmitting unit 5 can be transmitted to the other transmitting unit 9-2. Thus, the abnormal condition in the power source line 8 between the defective transmitting unit 5 and the call controller 4 can be notified from other transmitting units 5 to the pager terminal 6.

Figure 6:
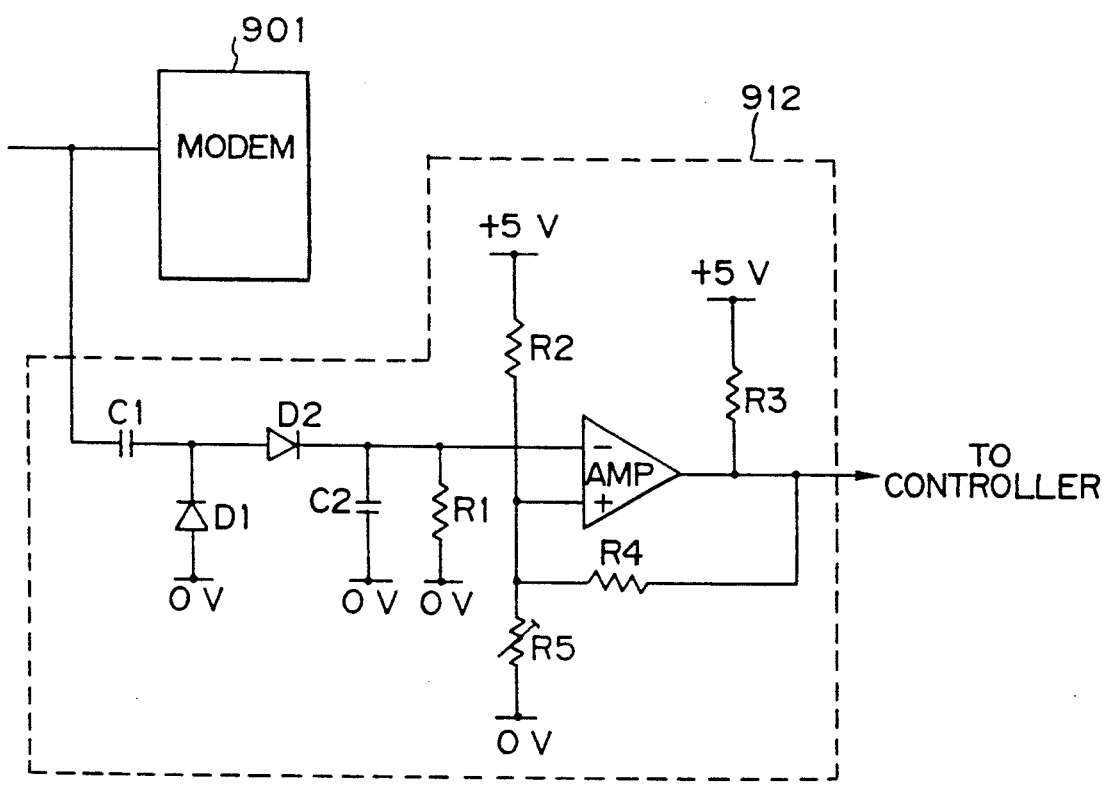
FIG. 6 shows a detailed configuration of the carrier detector.

FIG. 6 shows a detailed configuration of the carrier detector 912. The detector is connected to an input terminal of the modem 901, that is, to the terminal to which a signal provided by the modem 401 is applied.

The carrier detector 912 comprises capacitors C1, C2, D1, and D2; resistors R1, R2, R3, and R4; removable resistor R5; and a differential amplifier AMP. One end of the terminal of a capacitor C1 is connected to the input terminal of the modem, and the other terminal is connected to the cathode of a diode D1 whose anode is grounded and to the anode of a diode D2. The cathode of the diode D2 is connected to one end each of a capacitor C2 and a resistor R1 whose other ends are grounded and to an inverted input terminal of the differential amplifier. The non-inverted input terminal of the differential amplifier AMP is connected to the power source +5 V by the resistor R2, and connected to the power source 0 V (grounding level) through the removable resistor R5. The output of the differential amplifier is connected to the power source by the resistor R3 and to the non-inverted input by the resistor R41.

When there is no modulation nor any other signals to be transmitted from the modem 404 of the call controller 4, a signal comprising only a carrier is applied to the modem 901.

Simultaneously, it is applied to a rectifying circuit comprising the diodes D1 and D2 through the capacitor C1. As the input impedance of the rectifying circuit is high, there is no influence on the modem 901.

The signal rectified by the rectifying circuit is smoothed by the capacitor C2, indicating direct current as a whole. The resistor R1 connected in parallel to the capacitor C2 is provided to discharge excess power accumulated in the capacitor C2 when there are no carriers.

The voltage is smoothed by the capacitor C2 and applied to the differential amplifier AMP.

The 5 V voltage is parted by the resistor R2 and the removable resistor R5 is applied to the non-inverted input of the differential amplifier AMP. When the voltage applied to the inverted input is lower than the parted voltage, the output of the differential amplifier AMP is provided in the H level (5 V). Normally, the output indicates the L level (0 V) because it contains a modulation signal and a carrier. As the modem 404 usually outputs a modulation signal and a carrier, the output of the differential amplifier indicates the L level. However, when the signal line 7 is disconnected, a modulation signal or a carrier is not inputted, so the output of the differential amplifier turns to the H level. The sending unit 904 sends an emergency signal in the H level to a specific pager terminal.

The output of the differential amplifier AMP is pulled up by the resistor R3, but it is not necessary when the differential amplifier comprises a circuit such as SEPP, etc. The differential amplifier AMP is completely fed back by the resistor R4. This is conducted to obtain a Schmitt function for attaining a totally uniform detection result.

Figure 7:
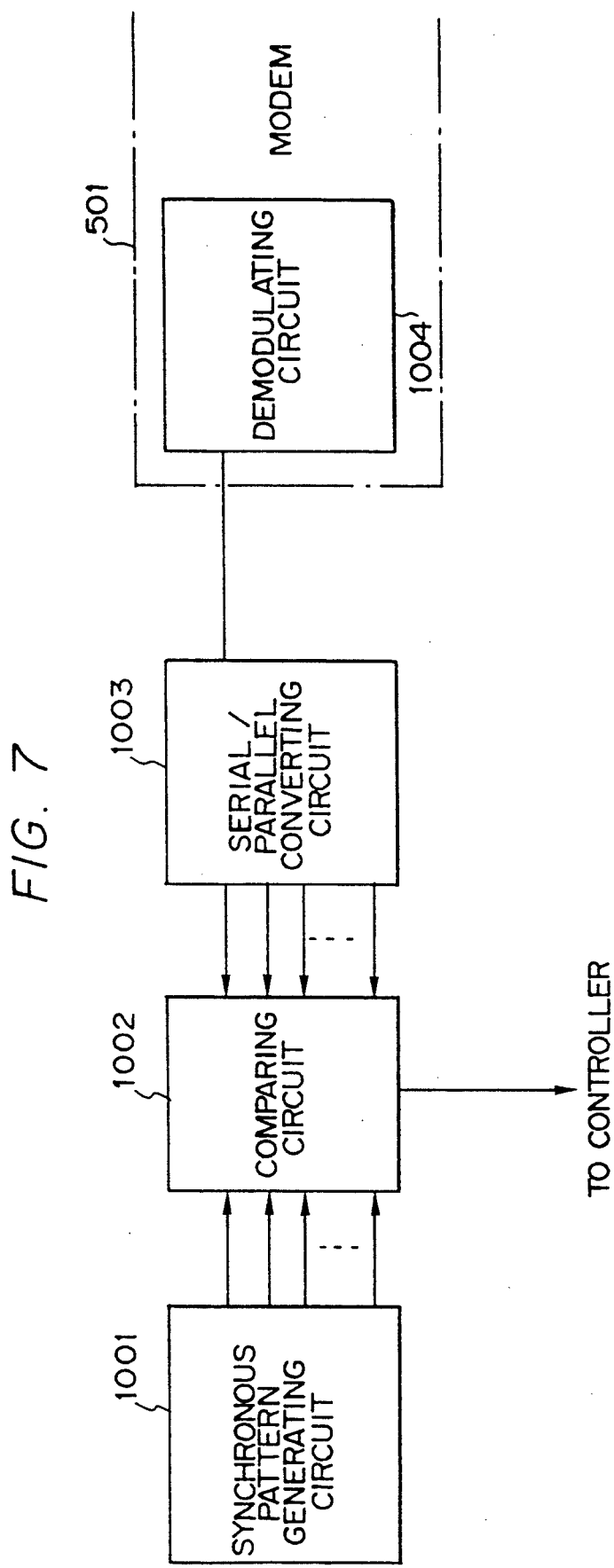
FIG. 7 shows a detailed configuration of the synchronous detector.

FIG. 7 shows a detailed configuration of the synchronous detector 920. The communication between the call controller 4 of the embodiment of the present invention and the transmitting units 9-1 and 9-2 through a modem as shown in FIG. 4 is an asynchronous communication. Therefore, the transmitting units 9-1 and 9-2 are provided with the synchronous detector 920.

When a pager terminal is called, call data are transmitted to a transmitting unit. On receiving the call data, the transmitting unit converts the call data and sends them to a wireless line.

The transmitting unit completes sending the call data, and then returns the result to the call controller. The following are samples of the result:

1. A carrier is sensed;
2. The data are not received successfully from the call controller; and
3. The transmitting unit is in a defective condition.

As data are transmitted without notice, it is necessary to perform a synchronous detection. In the 2-wire unit, the sending and receiving operations are conducted in the same line, so they must be appropriately controlled not to conflict with each other. Thus, a monitoring unit is required to solve the above described problem.

The synchronous detector 920 is provided to detect a specific pattern of the specific number of bits transmitted by the call controller 4, and comprises a synchronous pattern-generating circuit 1001 for generating a synchronous pattern; a serial/parallel converting circuit 1003 for converting a serial demodulation signal provided by a demodulating circuit 1004 in the modem 501 to parallel data; and a comparing circuit 1002 for comparing the output of the synchronous pattern generating circuit 1001 with the parallel output of the serial/parallel converting circuit 1003.

Serial data are outputted sequentially in 1 bit from the demodulating circuit 1004 in the modem 501 and applied to the serial/parallel converting circuit 1003. The serial/parallel converting circuit 1003 receives serial data sequentially in 1 bit and applies them to the comparing circuit 1002 as parallel data. These parallel data can be altered each time 1-bit data are received.

The comparing circuit 1002 compares the parallel data with the synchronous pattern outputted by the synchronous pattern generating circuit 1001, and outputs a timing pulse to the controller 921 when they correspond. The call controller 4 outputs the synchronous pattern data sequentially in 1 bit. The specific data in the above described synchronous pattern are the data to be transmitted.

The position of synchronous pattern can be determined by sequentially comparing each of 1-bit data obtained by the comparator from the serial/parallel converting circuit 1003. The data is received sequentially, and the whole data are received from the call controller 4.

Thus, the pager terminal 6 notifies a maintenance staff of an abnormal condition of the signal line 7 and the power source line 8, and, on receipt of the transmitted data, is notified that an abnormal condition has arisen without the monitor of the call controller 4. Instead of such a pager terminal, a portable telephone unit can be used by a maintenance staff for storing error messages notifying the maintenance staff of an error. If an abnormal condition has arisen in a signal line, the corresponding error message notifies the maintenance staff who carries the unit of the abnormal condition.

In an embodiment of the present invention, a monitoring function is provided in the call controller 4. This monitor is operated when an embodiment of the present invention is not installed. Therefore, with the present invention, it is not required, reducing the cost and the size of the system.

Furthermore, if the call controller 4 transmits abnormal condition information through the transmitting unit 9 when another abnormal condition arises, a maintenance staff is not required to stay near the call controller thus decreasing the number of necessary maintenance staffs.

The embodiment of the present invention comprises an in-house switching system in the description. However, it is obvious that the present invention does not limit its configuration to that described above. For example, a commonly used switching unit is applicable.

Therefore, in this embodiment, when an abnormal condition arises in the signal line 7 and the power source line 8, it is self-checked by the defective transmitting unit 9 without a monitoring function of the call controller 4, then notifying a maintenance staff person, thereby realizing a more efficient, cost-effective system.

As described above, according to the in-house paging system of the present invention, an abnormal condition of a signal line and a power source line can be notified immediately, and when an abnormal condition arises, it is self-checked by a transmitting unit without a monitoring function of a call controller, and then notified to a maintenance staff of it, allowing a more efficient and cost-effective resolution of the problem.

What is claimed is:

1. A data transmission method in a switching system for indicating, in response to a call request from an extension terminal, said call request issued to a receiving terminal through a wireless communication, the method comprising the following steps:
   a first step of detecting whether or not a request through the wireless communication can or cannot be made in response to said call request; and
   a second step of notifying said receiving terminal that said call request is not applied through said wireless communication when it is detected that the request cannot be made through said wireless communication.

2. A data transmission method according to claim 1, wherein:
   said first step detects a disconnection of a signal line for transmitting a signal to which said call request is applied from said extension terminal.

3. A data transmission method according to claim 1, wherein:
   said first step detects a disconnection of a power supply to a transmission unit which performs a communicating operation.

4. A data transmission unit comprising:
   a switching unit;
   a call controlling means for outputting a call request signal in response to a call request from an extension terminal through said switching unit;
   a transmitting means connected to said call controlling means for notifying of the call request through a wireless communication when said call request signal is applied;
   a detecting means for detecting an unnoticeable state of said call request signal; and
   a controlling means for notifying a receiving terminal of an abnormal condition via said transmitting means when said detecting means detects unnoticeable state.

5. A data transmission unit according to claim 4, wherein:
   said call controlling means includes a modem,
   said call request signal is a signal which is modulated by said modem contained in said call controlling means; and
   said detecting means detects that there are no carriers of said modem in said transmitting means.

6. A data transmission unit according to claim 4, wherein:
   said transmitting means contains a backup power source for providing a backup power supply when a power supply from said call controlling means is stopped; and
   said detecting means detects that said power supply is stopped.

7. A data transmission unit according to claim 4, wherein:
   said extension terminal is an extension telephone unit; and
   said switching unit is an in-house switching unit.

8. A data transmission unit according to claim 4, wherein said receiving terminal is a pager terminal.

9. A data transmission unit according to claim 4, wherein:
   said receiving terminal is a pager terminal provided for a maintenance staff.

10. A data transmission unit according to claim 4, wherein:
    said receiving terminal is a portable telephone unit provided for a maintenance staff.

11. A data transmission unit comprising:
    a plurality of transmission units each comprising a transmitting means for notifying a pager terminal of a call request signal through a wireless communication upon receiving said call request signal, and a detecting means for detecting an unnoticeable state of said call request signal, said transmission units notifying by said transmitting means of said state when said detecting means detects said unnoticeable state; and
    an extension switching means, to which extension terminals are connected, for connecting the extension terminals in response to a connection request of said extension terminals, for outputting said call request signal in response to said call request to the pager terminal, and for requesting one of said transmission units to send abnormal condition information to said pager terminal when said unnoticeable state is detected, in which a call request is not sent to said pager terminal in response to said call request signal applied to a transmission unit.

12. A data transmission unit comprising:
    an in-house switching unit;
    a call controller connected to said in-house switching unit for providing an interfacing process in response to a call request from an extension terminal;
    a plurality of pager terminals; and
    a plurality of transmitting units connected to said call controller through a signal line and a power source line, each transmission unit comprising a detecting part for detecting whether or not an abnormal condition has arisen in said signal line or said power source line, connected to said call control, a signal-and-power-source line abnormal signal transmitting means for transmitting to a pager terminal, using said detecting part, an abnormal condition signal in said signal line or said power source line, and a backup power battery used in case of power disconnection;

each pager terminal notifying a maintenance staff of a call signal from a respective transmitting unit upon receipt of said call signal.

* * * * *